United States Patent
Ukai et al.

(10) Patent No.: US 7,195,657 B2
(45) Date of Patent: Mar. 27, 2007

(54) HYDROGEN GENERATION SYSTEM AND FUEL CELL SYSTEM HAVING THE SAME

(75) Inventors: Kunihiro Ukai, Ikoma (JP); Kiyoshi Taguchi, Osaka (JP); Hidenobu Wakita, Yawata (JP); Seiji Fujihara, Osaka (JP); Akira Maenishi, Ikeda (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 482 days.

(21) Appl. No.: 10/395,848

(22) Filed: Mar. 25, 2003

(65) Prior Publication Data

US 2003/0198844 A1    Oct. 23, 2003

(30) Foreign Application Priority Data

Mar. 26, 2002    (JP) .............................. 2002-085106

(51) Int. Cl.
  B01J 7/00        (2006.01)
  B01J 10/00       (2006.01)
  B32B 27/04       (2006.01)
  B32B 5/02        (2006.01)
  C10J 3/20        (2006.01)

(52) U.S. Cl. .................... 48/61; 422/129; 422/105; 422/107; 422/108; 422/110; 48/75; 48/127.9

(58) Field of Classification Search ................ 422/109; 429/19; 122/412, 448.1, 447, 31.1, 32, 33; 392/394, 397, 307; 219/601

See application file for complete search history.

(56) References Cited

U.S. PATENT DOCUMENTS

| | | | |
|---|---|---|---|
| 5,229,102 A | 7/1993 | Minet et al. ................. 423/650 |
| 6,159,434 A * | 12/2000 | Gonjo et al. ................. 422/191 |
| 6,743,537 B2 * | 6/2004 | Shimazu ....................... 429/17 |
| 6,833,208 B2 * | 12/2004 | Kotani et al. ................. 429/20 |
| 2001/0002248 A1 | 5/2001 | Ukai et al. |
| 2002/0007595 A1 | 1/2002 | Maier-Roeltgen et al. |
| 2002/0061425 A1 * | 5/2002 | Kotani et al. ................. 429/19 |
| 2002/0071975 A1 * | 6/2002 | Shimazu ....................... 429/17 |
| 2003/0129470 A1 * | 7/2003 | Tajima et al. ................. 429/34 |

FOREIGN PATENT DOCUMENTS

| | | |
|---|---|---|
| JP | 05275103 | 10/1993 |
| JP | 10064570 | 3/1998 |
| JP | 200086203 | 3/2000 |
| JP | 2000095504 | 4/2000 |
| JP | 2002093447 | 3/2002 |
| JP | 2002151124 | 5/2002 |
| WO | WO-0192050 A1 * | 5/2000 |

* cited by examiner

Primary Examiner—Glenn Caldarola
Assistant Examiner—Kaity Handal
(74) Attorney, Agent, or Firm—Stevens, Davis, Miller & Mosher, LLP (57) ABSTRACT

A hydrogen generation system comprises a reformer 1 that contains a reforming catalyst, an evaporator 4 that supplies steam to the reformer 1, a heater 3 that heats the reformer 1 and the evaporator 4, a material feed portion 5 that feeds a feed material containing hydrocarbon compound to the reformer 1 through the evaporator 4, and a water supply portion 6 that has a flow rate switch 6a and supplies water to the reformer 1 and the evaporator 4.

8 Claims, 8 Drawing Sheets

HYDROGEN GENERATION SYSTEM AND FUEL CELL SYSTEM HAVING THE SAME

BACKGROUND OF THE INVENTION

1. Field of the Invention

The present invention relates to a hydrogen generation system configured to reform a fuel comprising compound containing at least carbon and hydrogen as major component to generate a hydrogen gas. More particularly, the present invention relates to a hydrogen generation system that operates uniquely in start, and a fuel cell system having the same.

2. Related Art

One example of a method of generating a hydrogen-rich gas is a steam reforming method in which an organic compound based fuel and water are reacted with each other using a reforming catalyst with heat externally applied. In the steam reforming method, in order to react the water with the fuel, the water needs to exist as steam in the reforming catalyst.

In a plant-scale hydrogen generation system using the steam reforming method, typically, a steam supply portion comprised of a boiler or the like is provided outside of the system, and the steam generated in the steam supply portion and the fuel are supplied to are forming catalyst bed. On the other hand, in a small-scale hydrogen generation system, typically, a steam supply portion is provided inside of the system and steam generated in the steam supply portion is used to cause steam reforming reaction to proceed. In a phosphoric acid fuel cell power generation system using a hydrogen gas as a fuel, which is one type of a distributed power generation system, steam is generated using heat resulting from operation of a fuel cell at a temperature of 200 to 250° C., and is supplied to the hydrogen generation system.

During steady operation of the hydrogen generation system, since the reforming catalyst is subjected to a constant thermal load, change in its catalytic activity is easy to check. On the other hand, during start of the system, the thermal load varies with an elapse of time, which might significantly degrades the catalytic activity. Accordingly, for the purpose of protecting the catalytic activity of the reforming catalyst to be used in steam reforming, it is desirable to supply the steam to the reforming catalyst bed in advance. To this end, in the hydrogen generation system having the steam supply portion such as the boiler, the steam is first generated stably in the steam supply portion and an operation of a reformer of the system is then started. Meanwhile, in a fuel cell power generation system which is one type of the distributed power generation system disclosed in Japanese Laid-Open Patent Application Publication No. Hei. 5-275103, the system is internally provided with a steam supply means, and an operation of a reformer of the system is started while supplying steam generated in the steam supply means to the reformer, using a nitrogen gas.

However, in the small-scale hydrogen generation system, for example, a home cogeneration system using a polymer fuel cell, if the hydrogen generation system is used along with a steam supply unit using an external heat source such as the boiler, energy efficiency, an operating cost, and cost of the system are reduced. Since the small-scale hydrogen generation system has a heat source for supplying heat required for reforming reaction, the heat derived from the heat source is commonly used to generate the steam. For example, in the hydrogen generation system using a natural gas as a fuel, steam reforming reaction is adapted to proceed in a reforming catalyst bed at a temperature of 650 to 750° C. Also, in the system using another hydrocarbon based fuel, the reforming catalyst bed is heated to a temperature approximately equal to that in the system using the natural gas. For the purpose of efficiently utilizing heat energy resulting from reforming reaction conducted at this high temperature, a hydrogen generation portion is generally configured to use heat resulting from the reforming reaction to generate steam. Thus, the hydrogen generation system provided with the steam generation portion allows effective use of the heat energy resulting from the reforming reaction during steady operation.

The hydrogen generation system for use in the home system needs to be adapted to operating conditions including frequent system starting and stopping operations, in contrast to the large-scale (e.g., plant-scale) system. During start of the system, heat energy supplied from the heat source is first used to heat the reforming catalyst and is then used to generate steam in the steam generation portion. Thus, since the heat energy is used with priority to heat the reforming catalyst during start of the system, there is a possibility that sufficient steam is not generated in the steam generation portion and is not supplied to the reforming catalyst at that time. As a result, depending on a configuration of the system or heating condition, the reforming catalyst is heated excessively and is subjected to large thermal load, and thereby the catalytic activity of the catalyst is degraded.

SUMMARY OF THE INVENTION

The present invention has been developed in view of the above-described problem, and an object of the present invention is to provide a hydrogen generation system, which is capable of reducing thermal load applied on a reforming catalyst during start of the system, and of dealing with repeated starting and stopping operations satisfactorily.

According to the present invention, there is provided a hydrogen generation system comprising: a reformer for generating a reformed gas that contains hydrogen by reforming reaction from a feed material and steam using a reforming catalyst; an evaporator for evaporating water into the steam which is supplied to the reformer; a heater for heating the reformer and the evaporator for reforming and evaporation, respectively; a material feed portion for feeding the feed material to the reformer directly or through the evaporator; a water supply portion for supplying the water; a first water passage through which the water is supplied from the water supply portion to the evaporator; and a second water supply passage through which the water is supplied from the water supply portion to the reformer.

In accordance with this configuration, the hydrogen generation system that conducts steam reforming of the feed material such as a hydrocarbon based fuel to generate the reformed gas containing hydrogen as a major component, has the first and second water supply passages provided to supply water to the evaporator and the reformer, respectively, and thereby, the steam can be supplied to the reformer during start of the system. Therefore, it is possible to avoid degradation of catalytic activity of the reforming catalyst in the reformer, which would be caused by deficiency of the steam in start of the system. As a result, water evaporation is optimized in operation of the system and the system can operate with increased energy use efficiency.

Upon starting supply of the feed material from the material feed portion to the reformer, the water may be supplied from the water supply portion to the reformer through the second water supply passage, and after an elapse of a predetermined time after starting the supply, the water may be supplied from the water supply portion to the evaporator through the first water supply passage, and the supply of the water to the reformer may be stopped.

With this configuration, the water is not supplied to the evaporator whose temperature has not been sufficiently increased but is directly supplied to the reformer that has an increased temperature sufficient to conduct water evaporation reaction and steam reforming reaction, while in a steady operation state after an elapse of a predetermined time, the water is supplied to the evaporator that has an increased temperature sufficient to conduct the water evaporation reaction and the supply of the water to the reformer is stopped. Thus, during start of the system and steady operation of the system, the steam can be supplied to the reformer smoothly and stably, and heat efficiency can be increased.

The reformer may have a temperature measuring portion for detecting a temperature of the reforming catalyst or a temperature of a gas inside the reformer, and based on temperature information detected by the reformer temperature measuring portion, supply of the feed material from the material feed portion and supply of the water from the water supply portion may be controlled.

With this configuration, since the supply of the water and the feed material supplied to the reformer and the evaporator, can be controlled based on the temperature of the reformer, it is possible to achieve a hydrogen generation system that can operate stably and gain increased heat efficiency.

In the system, when the temperature detected by the reformer temperature measuring portion is larger than a preset reference value, the water may be supplied from the water supply portion to the reformer through the second water supply passage and the feed material may be fed from the material feed portion to the reformer.

With this configuration, since the feed material and the water are reliably supplied to the reformer which has been heated sufficiently to conduct steam reforming reaction, the steam reforming can be conducted smoothly without clogging in a flow passage or degradation of catalytic activity of the reforming catalyst inside the reformer.

In the system, when the temperature detected by the reformer temperature measuring portion is larger than a preset first reference value, the water may be supplied from the water supply portion to the reformer through the second water supply passage and the feed material may be fed from the material feed portion to the reformer, and when the temperature detected by there former temperature measuring portion is larger than a preset second reference value larger than the first reference value, the water may be supplied from the water supply portion to the evaporator through the first water supply passage and the supply of the water to the reformer may be stopped.

With this configuration, since the feed material and the water are reliably supplied to the reformer which has been heated sufficiently to conduct reforming reaction and the steam reforming can be conducted smoothly therein, and at the time when the evaporator has been heated sufficiently to evaporate water, the water is supplied to the evaporator, where the water is evaporated into the steam. Therefore, the steam can be supplied stably to the reformer and heat efficiency can be increased.

The evaporator may have a temperature measuring portion for detecting a temperature of the evaporator or a temperature of a gas inside the evaporator, and based on temperature information detected by the evaporator temperature measuring portion, supply of the water from the water supply portion to the reformer and supply of the water from the water supply portion to the evaporator may be controlled.

With this configuration, since the water supply to the reformer and the evaporator can be controlled based on the temperature of the evaporator, it is possible to achieve a hydrogen generation system that can supply the steam stably and gain increased heat efficiency.

In the system, when the temperature detected by the evaporator temperature measuring portion is smaller than a preset reference value, the water may be supplied from the water supply portion to the reformer through the second water supply passage, and when the temperature detected by the evaporator temperature measuring portion is larger than the reference value, the water may be supplied from the water supply portion to the evaporator through the first water supply passage and the supply of the water to the reformer may be stopped.

With this configuration, the water is reliably supplied to the evaporator that has been heated sufficiently to conduct water evaporation reaction, the water evaporation can be conducted in the evaporator smoothly and the steam can be supplied stably.

The evaporator may have a heater for heating the evaporator. The heater of the evaporator may be controlled based on a temperature of the reformer or a temperature of the evaporator. Specifically, when the temperature of the reformer or the temperature of the evaporator is smaller than a preset reference value, the water may be supplied from the water supply portion to the reformer through the second water supply passage and the heater of the evaporator is operated, and when the temperature of the reformer or the temperature of the evaporator is larger than the reference value, the water may be supplied from the water supply portion to the evaporator through the first water supply passage and the operation of the heater of the evaporator may be stopped. Further, when the temperature of the reformer is larger than a preset first reference value, the feed material may be fed from the material feed portion to the reformer and the water may be supplied from the water supply portion to the reformer through the second water supply passage, and the heater of the evaporator may be operated, and when the temperature of the reformer is larger than a preset second reference value which is larger than the first reference value, the water may be supplied from the water supply portion to the evaporator through the first water supply passage and the supply of the water to the reformer is stopped, and the operation of the heater of the evaporator may be stopped.

The system may further comprise: a vaporizer for generating the steam from the water, the steam generated in the vaporizer being supplied to at least one of the reformer and the evaporator. The vaporizer may be controlled based on a temperature of the reformer or a temperature of the evaporator. Further, when the temperature of the reformer or the temperature of the evaporator is larger than a preset reference value, the water may be supplied from the water supply portion to the evaporator through the first water supply passage and the operation of the vaporizer may be stopped. Moreover, when the temperature of the reformer is larger than a preset first reference value, the feed material may be fed from the material feed portion to the reformer, and the vaporizer may be operated to allow the steam to be supplied to the reformer, and when the temperature of the reformer is larger than a preset second reference value which is larger than the first reference value, the water may be supplied from the water supply portion to the evaporator through the first water supply passage and the operation of the vaporizer may be stopped.

With the above configuration, the provision of the heater of the evaporator or the vaporizer facilitates generation of the steam. Thereby, the steam can be supplied to the reformer more stably. In addition, by controlling the operation of the heater of the evaporator or the operation of the vaporizer based on the temperature of the reformer or the temperature of the evaporator, the steam can be supplied stably and the heat efficiency can be increased.

The evaporator may include: a first evaporator placed in contact with the reformer so as to communicate with the reformer and connected to the water supply portion at least through the second water supply passage, the first evaporator being configured to evaporate the water supplied to the reformer at least through the second water passage into steam which is supplied to the reformer, and a second evaporator connected to the water supply portion through the first water supply passage, the second evaporator being configured to evaporate the water supplied from the water supply portion into the steam which is supplied to the reformer.

With this configuration, since the steam generated in the first evaporator is supplied to the reformer, the steam can be generated and supplied more stably.

The water supply portion may have a water supply switch for switching of water destination between the reformer and the evaporator. The water supply switch may be capable of adjusting a flow rate of the water to be supplied to the reformer and a flow rate of the water to be supplied to the evaporator. In addition, the water supply switch may be capable of switching of the water supply passage between the first water supply passage and the second water supply passage.

With this configuration, switching of water supply to the reformer and to the evaporator is easily achieved.

In the system, at a time when supply of the feed material to the reformer starts, at least one of the water and the steam may exist in at least one of the reformer and to the evaporator.

With this configuration, since at the start of the system, the water or the steam already exists in there former, the water evaporation reaction space of the evaporator, or the passage of the evaporator, the steam can be supplied smoothly to the reformer.

According to the present invention, there is also provided a fuel cell system comprising: a hydrogen generation system including a reformer for generating a reformed gas that contains hydrogen by reforming reaction from a feed material and steam using a reforming catalyst; an evaporator for evaporating water into the steam which is supplied to the reformer; a heater for heating the reformer and the evaporator for reforming and evaporation, respectively; a material feed portion for feeding the feed material to the reformer directly or through the evaporator; a water supply portion for supplying the water; a first water passage through which the water is supplied from the water supply portion to the evaporator; and a second water supply passage through which the water is supplied from the water supply portion to the reformer; and a fuel cell for generating a power using an oxidizing agent and hydrogen supplied from the hydrogen generation system.

With this configuration, since hydrogen can be supplied from the hydrogen generation system to the fuel cell stably and with high heat efficiency, highly-reliable and stable power generation can be carried out with high heat efficiency.

The above and further objects and features of the invention will more fully be apparent from the following detailed description with accompanying drawings.

DETAILED DESCRIPTION OF THE PREFERRED EMBODIMENTS

Hereinafter, embodiments of the present invention will be described with reference to the accompanying drawings. In the embodiments described below, a hydrogen generation system of the present invention is applied to a home power generation system using a fuel cell. The use of the hydrogen generation system of the present invention is not intended to be limited to this.

Hereinbelow, the same reference numerals designate the same or corresponding components throughout the drawings.

(First Embodiment)

Figure 1:
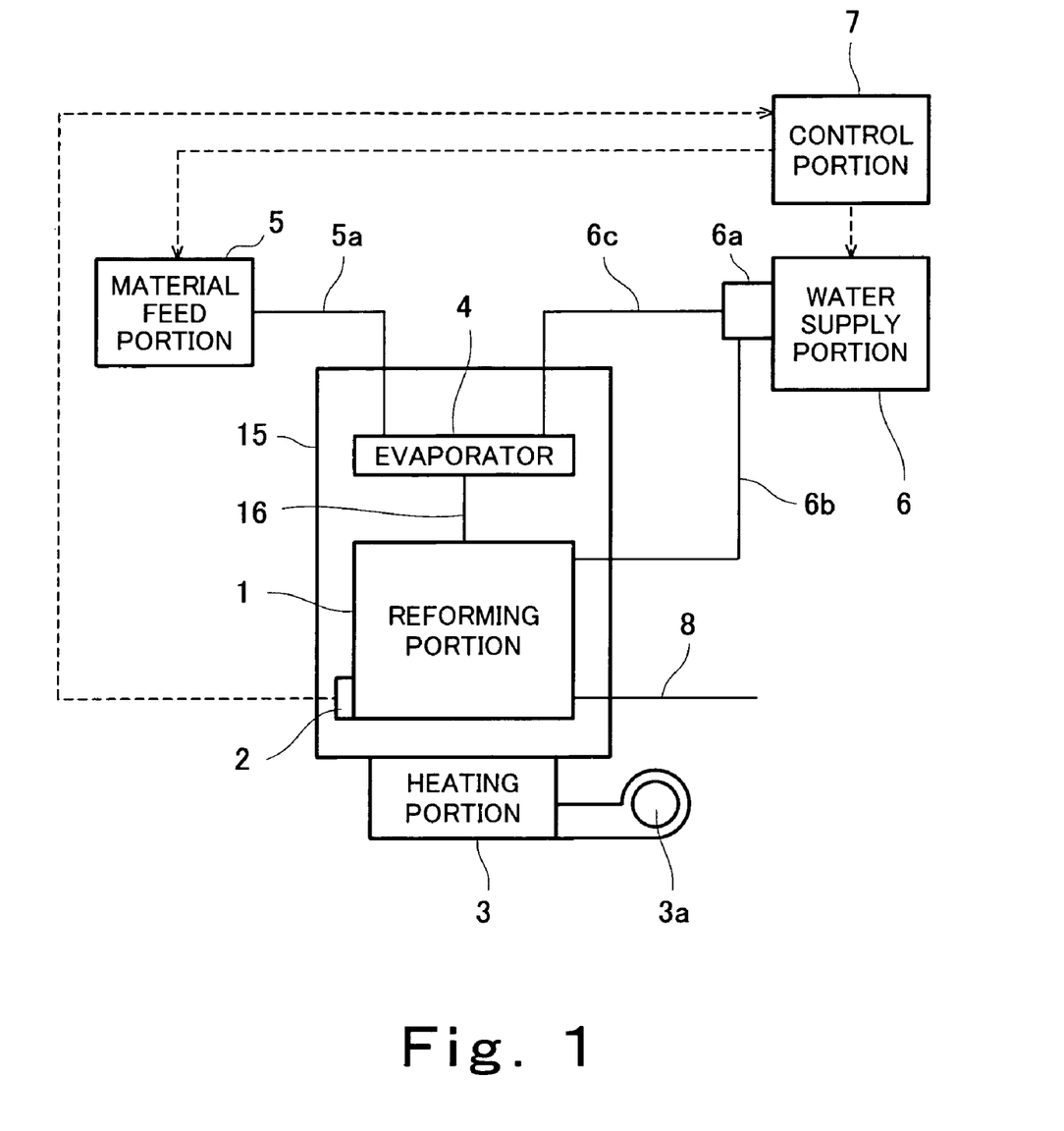
FIG. 1 is a view showing a configuration of a hydrogen generation system according to a first embodiment of the present invention.

FIG. 1 is a view showing a configuration of a hydrogen generation system according to a first embodiment of the present invention. Referring now to FIG. 1, the hydrogen generation system comprises a reformer 1, a heater 3, a material feed portion 5 for feeding a feed material to the reformer 1, a water supply portion 6 for supplying water to the reformer 1, an evaporator 4 for evaporating the water supplied from the water supply portion 6 to generate steam, and a control portion 7.

In this hydrogen generation system, the reformer 1 and the evaporator 4 are placed inside of a body 15, and the heater 3 for heating the reformer 1 and the evaporator 4 is placed below the body 15. The evaporator 4 is connected to the reformer 1 through a mixed material supply passage 16. A reformed gas passage 8 is connected to the reformer 1 to allow a reformed gas obtained by steam reforming reaction to be led from the reformer 1 to outside therethrough. The evaporator 4 is connected to the material feed portion 5 provided outside of the body 15 through a material feed passage 5a and to the water supply portion 6 through a supply passage 6c. The water supply portion 6 is connected to the reformer 1 through a supply passage 6b. The material feed portion 5 and the water supply portion 6 are respectively controlled by the control portion 7.

Figure 8:
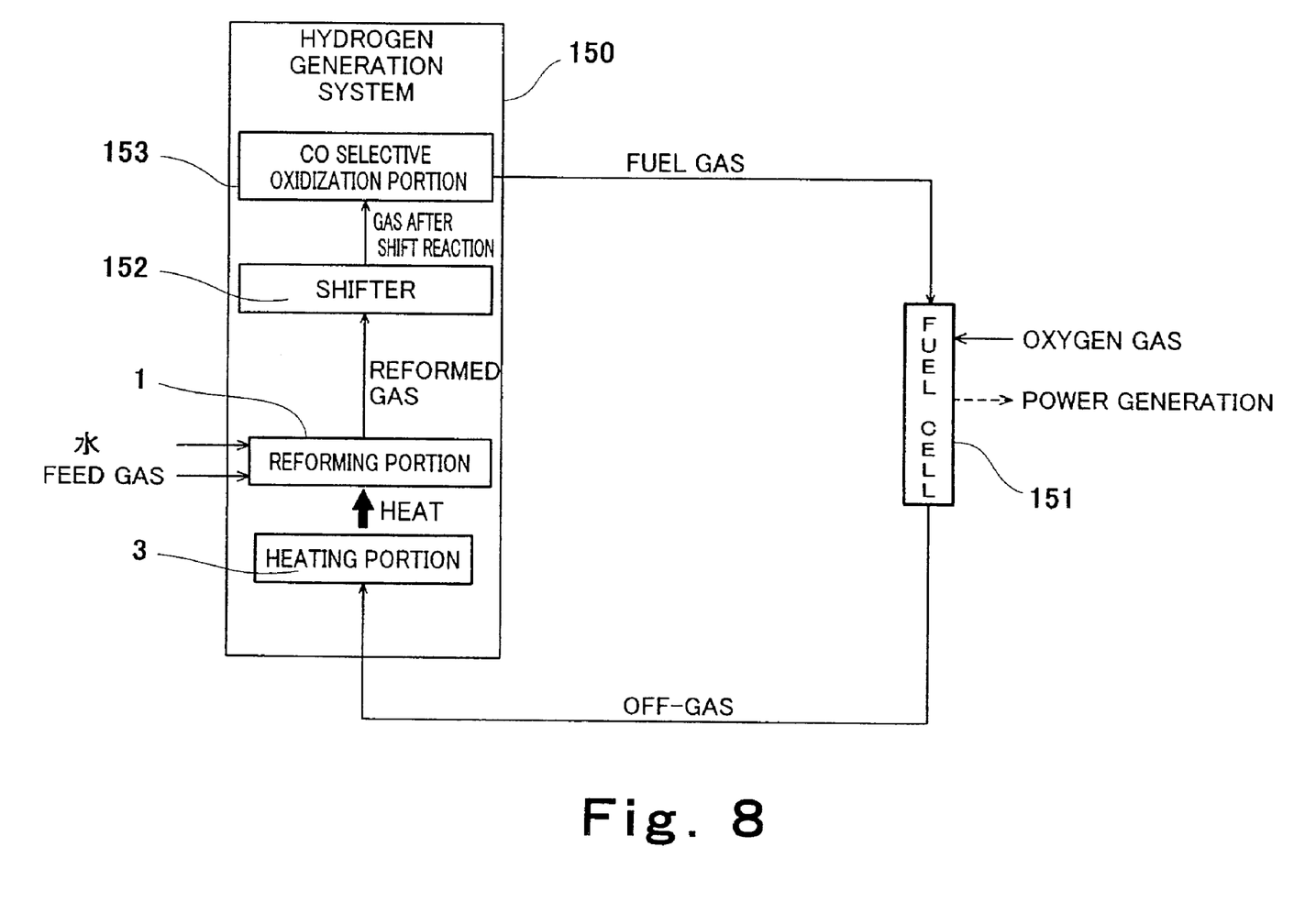
FIG. 8 is a schematic view showing a configuration of a fuel cell system comprising the hydrogen generation system in FIG. 1.

In the reformer 1, steam reforming reaction is mainly conducted in such a manner that a feed material fed from the material feed portion 5, for example, a feed material comprising compound containing at least carbon and hydrogen as major component, which is represented by hydrocarbon based compound, is steam-reformed using steam obtained by evaporating the water supplied from the water supply portion 6. Examples of the hydrocarbon based compound are hydrocarbon component such as a natural gas, or a LPG (liquefied petroleum gas), alcohol component such as methanol, or naphtha component. The reformer 1 has a reforming reaction portion configured to contain a reforming catalyst for causing the reforming reaction to proceed, for example, a ruthenium catalyst carried on an alumina carrier. The detail of an internal structure of the reformer 1 will not be described and will not be shown here in. There former 1 is provided with a temperature measuring portion 2 for measuring a temperature of an inside of the reformer 1. As used herein, the temperature of the reformer 1 refers to a temperature of the reforming catalyst or a temperature of a gas inside the reformer 1. The temperature measuring portion 2 has a thermocouple, a thermister, or the like, and is suitably provided at a location and in an atmosphere where the temperature of the reformer 1 can be measured. The reformed gas containing a hydrogen gas as major component, which is obtained by the steam reforming reaction conducted in the reformer 1, is supplied to the outside through the reformed gas passage 8. The hydrogen generation system may be configured such that a treating portion for treating the reformed gas according to a characteristic of an apparatus to which the reformed gas is supplied, is located downstream of the reformer 1 in a flow path of the reformed gas. For example, in a hydrogen generation system 150 that generates a hydrogen gas to be supplied to a fuel cell 151 in a fuel cell system in FIG. 8, if the hydrogen gas to be supplied to the fuel cell 151 contains carbon monoxide, then function of the fuel cell 151 is degraded, and it is therefore necessary to generate a gas containing carbon monoxide with a low concentration. To this end, a carbon monoxide shifter 152 for reducing carbon monoxide contained in the reformed gas, a carbon monoxide selective oxidation portion 153, and the like, may be provided downstream of the reformer 1. In this configuration, by using the hydrogen gas containing reduced carbon monoxide and an oxidizing agent containing oxygen, the fuel cell 151 can stably generate a power.

The heater 3 mainly serves to supply heat required for steam reforming reaction to the reformer 1, and also supply heat to the evaporator 4 because of the configuration of the system. The reformer 1, which first receives the heat from the heater 3, is located on upstream side, and the evaporator 4 is located on downstream side, in a flow path of heat. The heater 3 has a flame burner that combusts part of the feed material fed from the material feed portion 5, or an excess gas returned from a destination to which the hydrogen gas obtained by the hydrogen generation system was supplied (e.g., an off-gas derived from the fuel cell power generation system). The heater 3 further comprises, for example, a sirocco fan 3a for supplying combustion air to a flame burner.

The evaporator 4 is configured to evaporate the water supplied from the water supply portion 6 into steam using the heat from the heater 3, and the resulting steam is mixed with the feed material fed from the material feed portion 5 and supplied to the reformer 1 through a mixed material supply passage 16. Here, the evaporator 4 is capable of preheating the feed material fed from the material feed portion 5 as well as evaporating the water.

The material feed portion 5 serves to feed the feed material to the reformer 1. Here, as the feed material, a natural gas is used. Although not shown, the material feed portion 5 has a booster for increasing a supply pressure of the natural gas, a desulfurizing portion for reducing sulfur contained in the natural gas, and a zeolite absorbent for removing odorization from the natural gas.

The water supply portion 6 is provided with a plunger pump that pumps ion-exchanged water into the reformer 1 and the evaporator 4. The water supply portion 6 is provided with a flow rate switch 6a, which allows adjustment of the water to be supplied to the reformer 1 and the evaporator 4.

The control portion 7 is configured to control the material feed portion 5 and the water supply portion 6 so that the amount of feed material and the amount of water are adjustably supplied to the reformer 1 and the evaporator 4. The control portion 7 is also configured to control the flow rate switch 6a of the water supply portion 6 to select water destination. The control portion 7 has a temperature data processing portion to recognize a state of the reformer 1 from the temperature measured by the temperature measuring portion 2, and is configured to control the material feed portion 5 and the water supply portion 6 based on the information obtained in the temperature data processing portion, thereby adjusting supply amount of the feed material, air, and water. The control portion 7 further has a storage portion including a semiconductor (not shown) to store the temperature of the reformer 1 therein.

For the purpose of increased energy use efficiency in operation of the system, the hydrogen generation system of this embodiment is operated in such a manner that the heater 3 is activated to heat the reformer 1, and then, using excess heat after heating of the reformer 1, the evaporator 4 is heated. The reasons for this are as follows: i) Since the steam reforming reaction conducted in the reformer 1 is an endothermic reaction, and for the purpose of high reaction rate, the reformer 1 is required to be kept at a temperature as high as 650 to 800° C. when using a hydrocarbon based material and to be kept at a temperature as high as 300° C. or more when using an alcohol based material, high-quality heat energy derived from the heater 3 is desirably used with priority in the reformer 1. ii) In steady operation of the system, energy use efficiency in the entire system is desirably increased by performing heat recovery efficiently by using the heat energy derived from the heater 3 to evaporate the water in the evaporator 4.

However, when heating of the reformer 1 precedes heating of the evaporator 4 as described above, generation of the steam in the evaporator 4 is delayed depending on the configuration of the system, heating conditions, or the like, during start of the system. Under the condition, sufficient steam is not supplied to the reformer 1, thereby causing the reforming catalyst to be heated excessively. When heated excessively, a specific surface area of catalyst and its catalytic activity are reduced. If the feed material (natural gas) is fed to the high-temperature reforming catalyst under the insufficient steam condition, there is a high possibility that carbon contained in the feed material precipitates. Accordingly, in the hydrogen generation system of this embodiment, the steam is generated smoothly as described following during the start of the system, thereby reducing a thermal load applied on the reforming catalyst, which state occurs in the conventional hydrogen generation system as mentioned previously.

Hereinafter, a starting operation of the hydrogen generation system of this embodiment will be described in conjunction with its effects.

First of all, to start the system in a stop state, the heater 3 is activated to heat the body of 15 of the system. Here, the reformer 1 is heated with priority from the heat from the heater 3. Then, the natural gas, as the feed material, is fed from the material feed portion 5 to the evaporator 4 through the material feed passage 5a, and is further fed to the reformer 1 through the mixed material supply passage 16. Meanwhile, the water, which will be converted into the steam to be used in the steam reforming reaction, is supplied from the water supply portion 6 to the reformer 1. At this time, the flow rate switch 6a switches the water supply passage to select either the supply passage 6b to the reformer 1 or the supply passage 6c to the evaporator 4.

For example, in the case where, during start of the system (i.e., in an initial stage of heating), the water is supplied from the water supply portion 6 to the evaporator 4 through the supply passage 6c, and then, in the evaporator 4, the water is evaporated and the resulting steam and the feed material are supplied to the reformer 1 through the mixed material supply passage 16, there is a possibility that a percentage of the feed material (natural gas) is higher than a percentage of the steam in the mixed feed material fed to the reformer 1. The reason for this will be described. When the heater 3 is activated at the start of the system, the heat from the heater 3 is used with priority to heat the reformer 1 as described above. As a result, temperature increase in the evaporator 4 is delayed according to heat capacity of the reformer 1 although its state is non-uniform depending on the size of the system or arrangement of components of the system. That is, the temperature of the evaporator 4 is not yet sufficiently increased. In this state, when water is supplied to the reformer 1 through the evaporator 4, water is not sufficiently evaporated in the evaporator 4, and thereby sufficient steam is not obtained, so that only the natural gas is fed to the reformer 1. Under the condition in which the water is insufficiently evaporated, i.e., the condition in which sufficient steam is not supplied to the reformer 1, if the reformer 1 is heated, thereby causing temperature of the reforming catalyst contained in the reformer 1 to be increased, then the natural gas is thermally decomposed, and carbon precipitates on the reforming catalyst and inside the reformer 1. This would lead to degradation of the catalytic activity of the reforming catalyst and clogging in a flow passage inside the reformer 1. In addition, the steam reforming reaction inside the reformer 1 is an endothermic reaction, and therefore, the temperature of the reforming catalyst tends to be elevated due to the fact that the heat given by the heater 3 remains unused unless the steam reforming reaction proceeds in the reforming catalyst. As a result, the catalytic activity would be degraded. Accordingly, in this embodiment, to avoid degradation of the catalytic activity of the reforming catalyst or the like, sufficient steam is supplied to the reformer 1 in the initial stage of heating in the following way.

In this embodiment, since the water supply portion 6 is provided with the supply passage 6b to the reformer 1 and the supply passage 6c to the evaporator 4, the water is supplied to the reformer 1 and the evaporator 4, and the flow rate switch 6a adjusts the amount of water to be led to the supply passage 6b and the amount of the water to be led to the supply passage 6c. Thus, the amount of water to be supplied to the reformer 1 and the amount of water to be supplied to the evaporator 4 can be controlled. With this configuration, during a time period just after start of the system when the evaporator 4 is not sufficiently heated and thereby the water is not sufficiently evaporated in the evaporator 4, the flow rate switch 6a is adjusted so that the water is delivered from the water supply portion 6 to the supply passage 6b, and the water is directly supplied to the reformer 1 through the supply passage 6b. By doing so, the water is evaporated in the reformer 1 which has been heated with priority and thereby has an increased temperature. As a result, upon start of the system, the steam exists in a stable condition inside the reformer 1, and therefore, precipitation of carbon due to thermal decomposition of the feed material hardly occurs. With an increase in the temperature of the reforming catalyst in the reformer 1 where the steam and feed material coexist, the steam reforming reaction as the endothermic reaction proceeds on the reforming catalyst. Thereby, the reforming catalyst is prevented from being heated excessively.

However, when the water is directly supplied to the reformer 1 and evaporation of the water (water evaporation reaction) is conducted in the reformer 1 as described above, the heat supplied from the heater 3 to the reformer 1 is partially used for the water evaporation reaction. Therefore, in contrast to the case where the heat from the heater 3 is not used for the water evaporation reaction, i.e., pre-generated steam is directly to the reformer 1, the temperature of the reformer 1 is lowered because of the used heat, under the equal heat supply amount. So, in order to keep the reformer 1 at a temperature suitable for the steam reforming reaction, it is necessary to supply more heat from the heater 3 to the reformer 1 than in the case where heat is not used for the water evaporation reaction. As should be understood from the above, when the water is directly supplied to the reformer 1, heat efficiency of the steam reforming reaction tends to be reduced.

Accordingly, for the purpose of suppressing such reduction of heat efficiency, in this embodiment, in the state in which a predetermined time elapses after start of the system and the evaporator 4 has been heated sufficiently to allow the water to be sufficiently evaporated therein (i.e., during steady operation), the flow rate switch 6a is controlled to switch of the supply passage from the supply passage 6b to the supply passage 6c. Then, the water is supplied to the evaporator 4 through the supply passage 6c. Such switching is accomplished by timer-control of the flow rate switch 6a, which is executed by the control portion 7. The water supplied to the evaporator 4 is converted into steam through the water evaporation reaction in the evaporator 4. Then, the steam and the feed material are supplied to the reformer 1 through the mixed material supply passage 16. By operating the system during steady operation of the system in this manner, in the reformer 1, the heat from the heater 3 is efficiently used for the steam reforming reaction without a loss of heat due to the water evaporation reaction. Also, in the evaporator 4, the steam is generated efficiently using the heat from the heater 3.

Thus, in the system of this embodiment, in the initial stage of heating, by conducting the water evaporation reaction in the reformer 1, deficiency of steam inside the reformer 1 is avoided and excessive heating and precipitation of carbons in the reformer 1 are thereby prevented. In addition, during the steady operation of the system, since the heat from the heater 3 is effectively used to generate the steam in the evaporator 4, heat efficiency of the steam reforming reaction in the reformer 1 can be increased. Consequently, it is possible to achieve a hydrogen generation system which can increase heat efficiency and stably generate hydrogen.

The amount of water to be supplied to the reformer 1 in the initial stage of heating and during the steady operation is preset in view of a reaction temperature in the reformer 1 and use condition such as catalyst volume. One preferable measure of the amount of water is twice or more of the number of carbon atoms contained in the feed material (natural gas). In this embodiment, for example, the measure is 2.5 times.

With regard to start time of supply of the feed material and the water during start of the system, the control portion 7 controls the material feed portion 5 and the water supply portion 6 based on the temperature of the reformer 1 which is detected by the temperature measuring portion 2. For example, a reference value is set in a temperature detected by the temperature measuring portion 2, and when the detected temperature exceeds the reference value, the control portion 7 controls the material feed portion 5, the water supply portion 6, and the flow rate switch 6a so that supply of the feed material and supply of the water are started. Here, the reference value is set to 200° C. This can lessen variation in timings for starting supply of the feed material and the water, and allow the water evaporation to proceed smoothly and stably in the reformer 1, and excessive heating in the reformer 1 to be effectively prevented. When a large amount of water is supplied to the reformer 1 under a low-temperature condition, a gas flow passage might be clogged with the water remaining unevaporated in the reformer 1. But, such situation is avoided by supplying the water after checking that the temperature of the reformer 1 has exceeded the reference value. It is necessary to determine the reference value based on correlation between the temperature of the reformer 1 and reactivity of the steam reforming reaction, or correlation between the temperature of the reformer 1 and an evaporation state of water. Therefore, the reference value varies depending on the size of the system or assumed operating conditions, and 200° C. is only illustrative. Preferably, a lower limit value of the reference value is preset with reference to a temperature at which water is evaporated and a an upper limit value thereof is present with reference to a heat-resistant temperature of the reforming catalyst.

In the above configuration, the flow rate switch 6a is configured to switch the water supply passage from the supply passage 6b to the supply passage 6c by timer control. To execute such timer control, time is preset to optimize temperature of the reforming catalyst and the evaporation state of water, in view of the size of the system or the operating condition.

Alternatively, switching of water supply may be performed by any suitable methods other than he above timer control. As a modification (another example) of this embodiment, for optimized water evaporation, switching of water supply may be performed based on the temperature of the reformer 1. Specifically, a reference value (also referred to as a second reference value) which is different from the above-identified reference value (also referred to as a first reference value) associated with start of supply of the feed material and the water, is set in a temperature detected by the measuring portion 2, and based on the second reference value, the control portion 7 controls the flow rate switch 6a. The second reference value is set based on correlation between the temperature of the reformer 1 and a heating state of the evaporator 4, and is equal to the temperature of the reformer 1, which corresponds to the state of the evaporator 4 which has been heated sufficiently to enable water evaporation reaction. For example, the second reference value is set to 700° C. The second reference value is suitably preset and varies according to the size of the system or assumed operating conditions.

Subsequently, switching operation of the supply passage will be described. First of all, when the temperature detected by the measuring portion 2 has exceeded the second reference value, i.e., the evaporator 4 has been heated sufficiently to be suitable for water evaporation reaction, the control portion 7 controls the flow rate switch 6a to switch the water supply passage from the supply passage 6b to the supply passage 6c. Thereby, the water, which was directly supplied to the reformer 1 through the supply passage 6b, is supplied to the reformer 1 through the supply passage 6c and the evaporator 4. Thus, by switching of water supply based on the state of the evaporator 4 judged from the temperature of the reformer 1, switching can smoothly occur. In addition, deficiency of steam in the reformer 1 in switching is reliably avoided.

While the feed material is fed from the material feed portion 5 to the reformer 1 through the evaporator 4, the gas may be directly fed to the reformer 1 without flowing through the evaporator 4. It should be appreciated that, when the feed material is fed through the evaporator 4, the gas is preheated by the evaporator 4, and therefore heat efficiency is increased.

In this embodiment, during start of the system, the reformer 1 is first heated and then the feed material and the water are simultaneously supplied to reformer 1. Instead, the water may be first supplied to the reformer 1 and then the feed material may be supplied to the same. Also, alternatively, water which would not cause adverse effects, such as clogging of the gas flow passage, may be supplied in advance to a water evaporation region of the reformer 1 and the evaporator 4, before being sufficiently heated. Also, in that case, the effects of the present invention are obtained. Thus, by supplying the water to the reformer 1 or the evaporator 4 in advance, the steam can be smoothly generated in the initial stage of heating. By doing so, thermal degradation of the reforming catalyst, precipitation of carbons, and the like, which would otherwise occur in the initial stage of heating in the reformer 1, can be effectively avoided.

In this embodiment, switching of the water supply passage by the flow rate switch 6a may be controlled in such a manner that the amount of water to be supplied from the water supply portion 6 to the supply passage 6b and to the supply passage 6c is adjusted by, for example, adjusting an operating condition of a feed pump. Alternatively, the switching may be controlled by adjusting opening and closing of electromagnetic valves provided in the passages 6b and 6c. Further, alternatively, the switching may be performed stepwise such that the amount of water to be supplied to the reformer 1 and the amount of water to be supplied to the evaporator 4 are gradually changed. Moreover, alternatively, switching from the reformer 1 to the evaporator 4 may be accomplished by fully opening and fully closing the electromagnetic valves provided in the passages 6b and 6c at a time.

(Second Embodiment)

A second embodiment of the present invention will be described.

Figure 2:
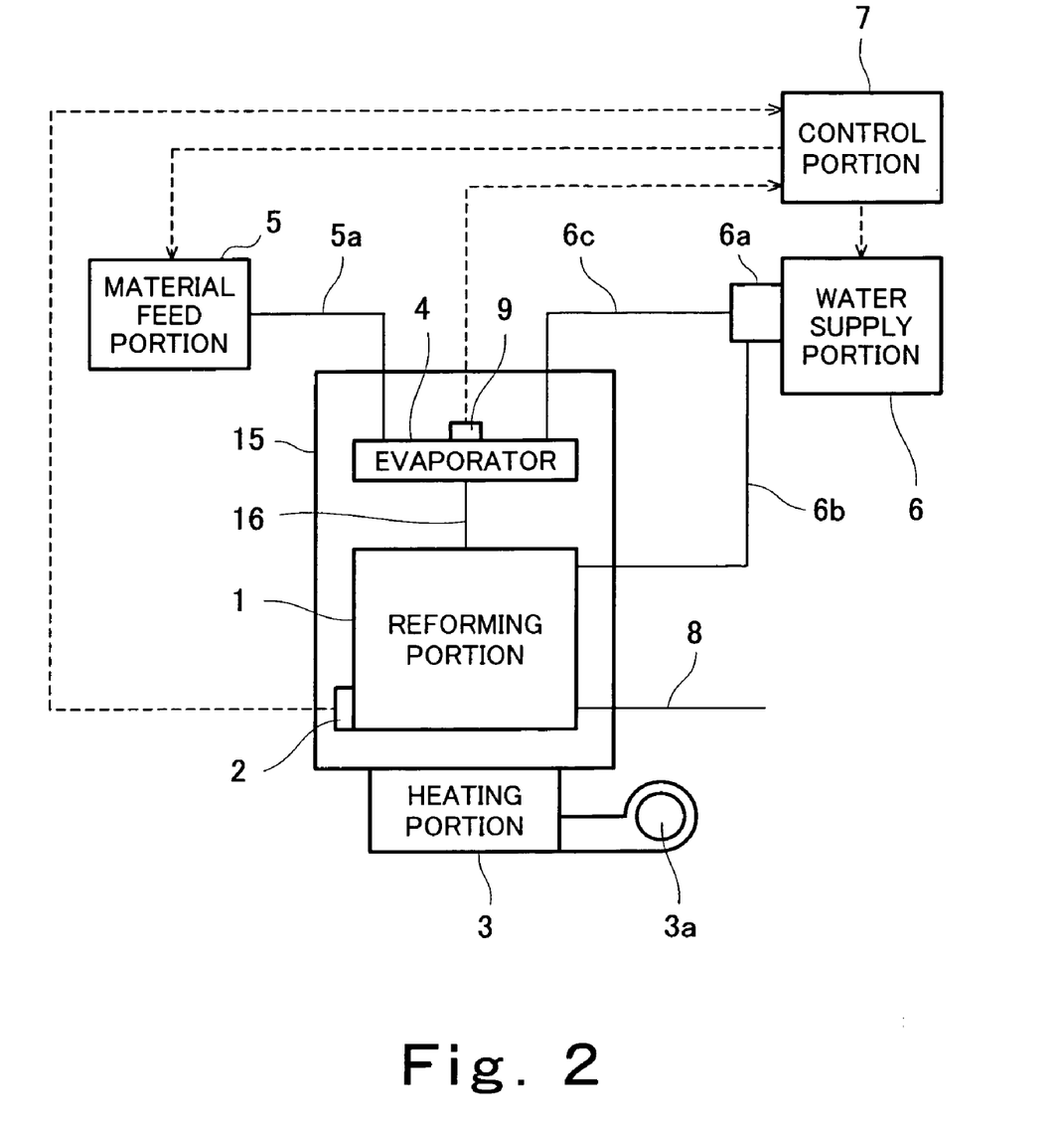
FIG. 2 is a view showing a configuration of a hydrogen generation system according to a second embodiment of the present invention.

FIG. 2 is a view showing a configuration of a hydrogen generation system according to the second embodiment of the present invention. The hydrogen generation system of this embodiment has a configuration almost identical to that of the system of the first embodiment except that the evaporator 4 is provided with a temperature measuring portion 9 to detect a temperature of the evaporator 4 or a temperature of a gas inside the evaporator 4.

Since an operation of the system of this embodiment is similar to that of the first embodiment, its detail will not be further described and only difference between them will be described. In the system of this embodiment with the evaporator 4 provided with the temperature measuring portion 9, a reference value is set in a temperature detected by the temperature measuring portion 9, and when the detected temperature has exceeded the reference value, the flow rate switch 6a switches the water destination from the reformer 1 to the evaporator 4 in the same manner as described in the first embodiment. The reference value is set to, for example, 200° C. in view of a generation state of the steam in the evaporator 4 based on operating conditions of the system. The reference value varies and is therefore suitably set depending on the size of the system or operating conditions such as the amount of water supply.

While the heating state of the evaporator 4 is judged indirectly from the temperature of the reformer 1 which is detected by the temperature measuring portion 2 in the first embodiment, the temperature of the evaporator 4 is measured directly by using the temperature measuring portion 9. Therefore, water can be supplied at more appropriate timing to the evaporator 4 which has been heated to be suitable for water evaporation. Therefore, in switching of water supply, the steam is generated smoothly and stably, and water evaporation is optimized. As a result, deficiency of the steam in the reformer 1 in switching can be avoided.

(Third Embodiment)

A third embodiment of the present invention will be described.

Figure 3:
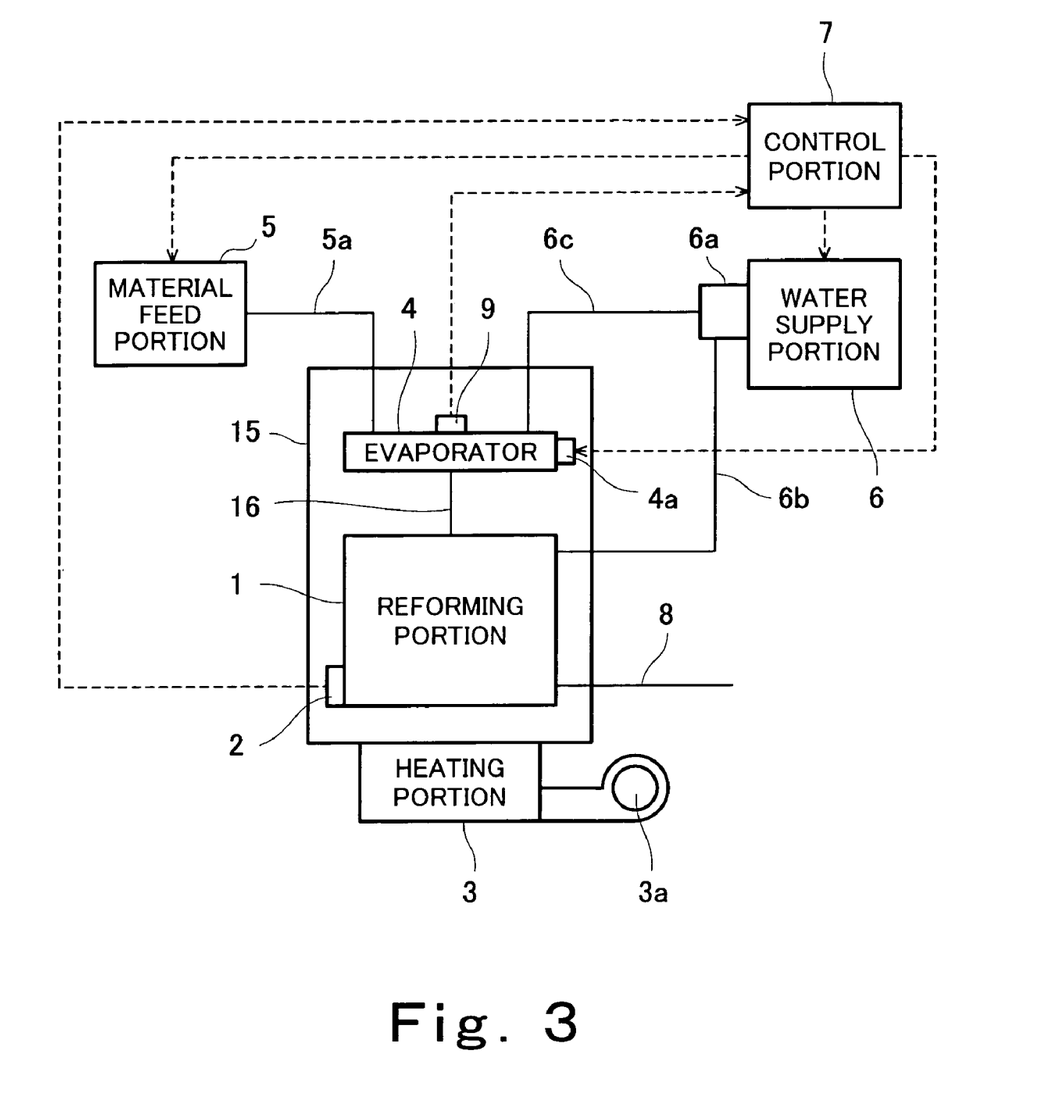
FIG. 3 is a view showing a configuration of a hydrogen generation system according to a third embodiment of the present invention.

FIG. 3 is a view showing a configuration of a hydrogen generation system according to the third embodiment of the present invention. The hydrogen generation system of this embodiment has a configuration almost identical to that of the system of the second embodiment except that the evaporator 4 is provided with an heater 4a for heating the evaporator 4 or a gas inside the evaporator 4. The heater 4a is comprised of a sheath heater which is located on a downstream face of the evaporator 4 to allow water supplied from an upstream face side of the evaporator 4 to be evaporated in the evaporator 4, although this is not specifically shown.

Since an operation of the system of this embodiment is similar to that of the first embodiment, its detail will not be further described and only difference between them will be described. Specifically, in the system of the present invention, the heater 4a is activated during start of the system to smoothly heat the evaporator 4 to the state in which water evaporation can be conducted therein. As mentioned previously in the first embodiment, just after start of the system, the temperature of the evaporator 4 is less likely to be increased and therefore it takes time to heat the evaporator 4 to the state in which water is evaporated therein. But, in this embodiment, the heater 4a is provided to directly heat the evaporator 4. This enables water to be evaporated more smoothly in the evaporator 4. Thereby, even when water is supplied to the evaporator 4 just after start of the system, the steam is generated smoothly and stably. In accordance with the configuration of this embodiment, if water should be supplied only to the evaporator 4 during start of the system, the steam is generated in the evaporator 4. Therefore, deficiency of the steam in the reformer 1 can be avoided.

The operation of the heater 4a is stopped at the time when water evaporation sufficiently occurs in the evaporator 4 only by heat from the heater 3. It is desirable to judge whether or not to stop the heater 4a based on the temperature detected by the temperature measuring portion 2 or the temperature detected by the temperature measuring portion 9. Thereby, water evaporation is optimized with increased heat efficiency. Specifically, a temperature of the reformer 1 or a temperature of the evaporator 4 at which the evaporator 4 can generate sufficient steam is preset as a reference value in the temperature detected by the temperature measuring portion 2 or the temperature detected by the temperature measuring portion 9. Here, the reference value is set to 700° C. in the temperature measuring portion 2. When the detected temperature has exceeded the reference value, the control portion 7 stops the heater 4a. The reference value is suitably set depending on the size of the system or the operating condition.

(Fourth Embodiment)

A fourth embodiment of the present invention will be described.

Figure 4:
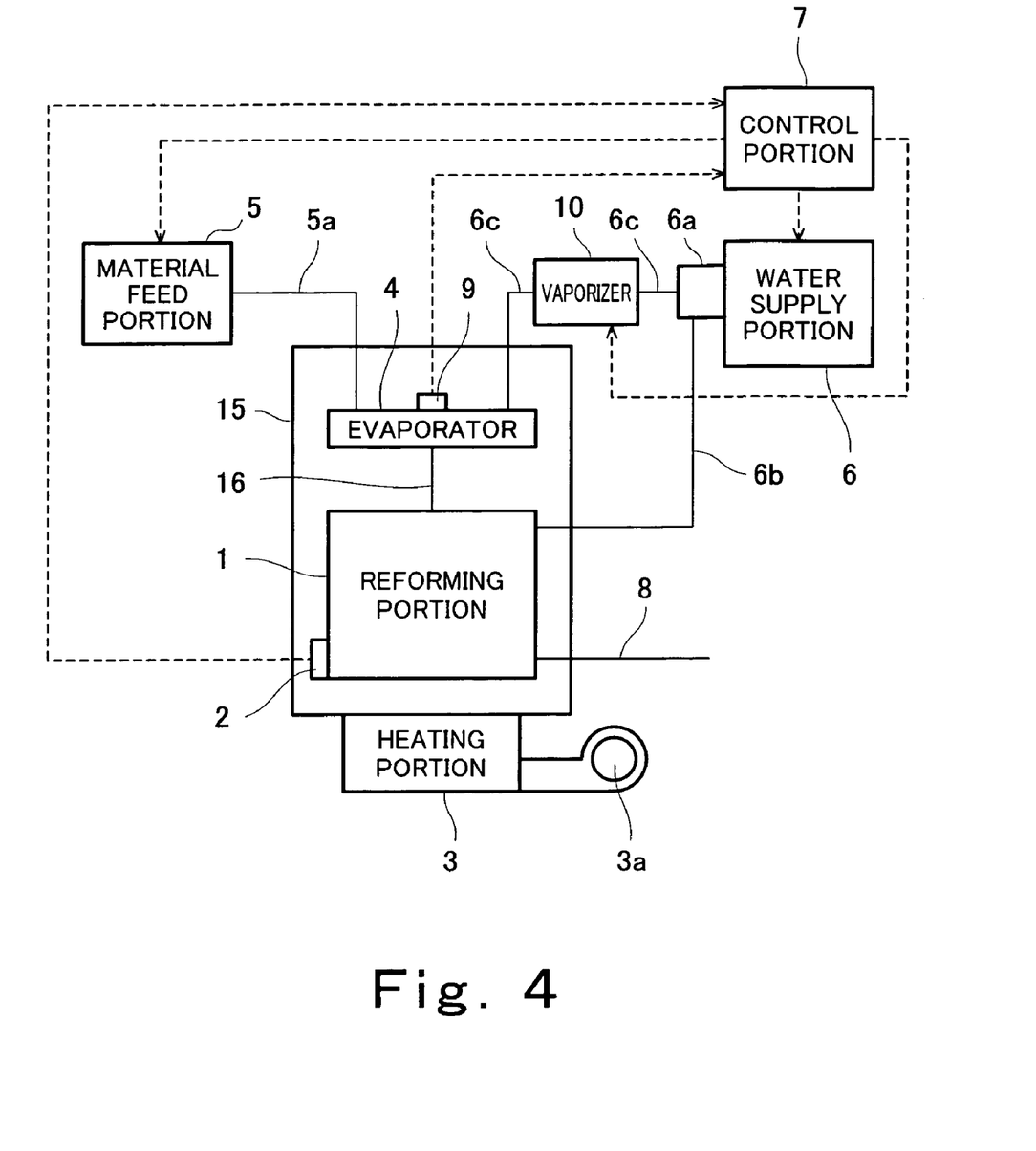
FIG. 4 is a view showing a configuration of a hydrogen generation system according to a fourth embodiment of the present invention.
Figure 5:
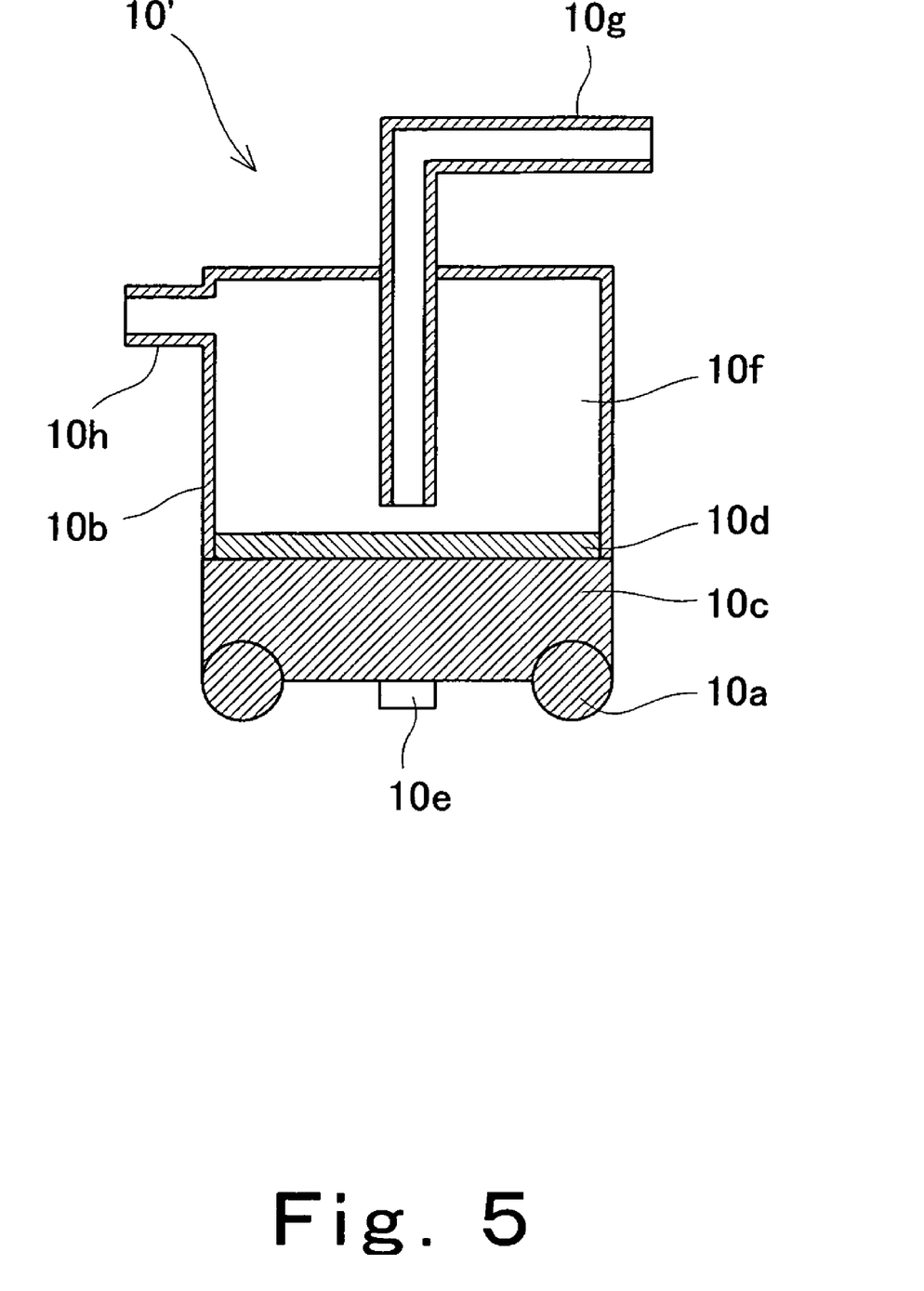
FIG. 5 is a schematic view showing a configuration of a vaporizer in the hydrogen generation system in FIG. 4.

FIG. 4 is a view showing a configuration of a hydrogen generation system according to the fourth embodiment. The hydrogen generation system of this embodiment has a configuration almost identical to that of the system of the second embodiment except that a vaporizer 10 is provided at a position in the supply passage 6c through which water is supplied to the evaporator 4. FIG. 5 is a schematic cross-sectional view showing an example of a configuration of the vaporizer 10 of this embodiment, i.e., a vaporizing unit 10'.

As shown in FIGS. 4 and 5, in this embodiment, the vaporizing unit 10' is provided in the supply passage 6c connecting the water supply portion 6 to the evaporator 4. The vaporizing unit 10' has a body 10b having a water inlet 10g and a steam exit 10h. The body 10b contains an electric heater 10a such as a sheath heater, a heat accumulator 10c, a water evaporator 10d, and an evaporation space 10f, and a heat accumulator temperature measuring portion 10e for measuring a temperature of the heat accumulator 10c. The water inlet 10g and the steam exit 10h are each connected to the supply passage 6c. The heat accumulator temperature measuring portion 10e is attached on an outer wall of the body 10b.

In the vaporizing unit 10', the water delivered from the water supply portion 6 through the supply passage 6c is introduced into the evaporation space 10f through the water inlet 10g. Inside the vaporizing unit 10', heat derived from the electric heater 10a is given to water within the evaporation space 10f through the heat accumulator 10c and the water evaporator 10d (e.g., porous metal) provided to stabilize water evaporation. The heat causes the water to be vaporized into steam. The steam is supplied from the steam exit 10h to the evaporator 4 through the supply passage 6c. Here, a temperature of the heat accumulator 10c is measured by the heat accumulator temperature measuring portion 10e, and based on the detected temperature, water vaporization is controlled. As a result, the vaporizing unit 10' can vaporize water stably and efficiently.

Since an operation of the system of this embodiment provided with the vaporizer 10 is similar to that of the first embodiment, its detail will not be further described and only difference between them will be described. In the system of this embodiment during start of the system, the vaporizer 10 (vaporizing unit 10') is activated as described above, and the steam obtained in the vaporizer 10 is supplied to the evaporator 4. As described in the first embodiment, after start of the system, it takes time for the evaporator 4 to be heated to the state in which water is evaporated therein. So, by generating the steam in advance in the vaporizer 10 and supplying the steam to the evaporator 4, the steam can be supplied smoothly and stably from the evaporator 4 to the reformer 1 even just after start of the system.

The operation of the vaporizer 10 is stopped at the time when water evaporation sufficiently occurs in the evaporator 4 only from the heat by the heater 3. It is desirable to judge whether or not to stop the vaporizer 10 based on the temperature detected by the temperature measuring portion 2 or the temperature detected by the temperature measuring portion 9. Thereby, water evaporation is optimized with increased heat efficiency. Specifically, the temperature of the reformer 1 or the temperature of the evaporator 4 at which sufficient steam is generated in the evaporator 4 is preset as a reference value in the temperature detected by the temperature measuring portion 2 or the temperature detected by the temperature measuring portion 9. It is desirable to control starting and stopping operations of the vaporizer 10 based on the reference value.

The vaporizer 10 may be always operated, but, considering the energy consumption necessary for vaporizing water, desirably, the operation of the vaporizer 10 is stopped and the steam is generated only in the evaporator 4 at the time when the evaporator 4 can generate the steam for itself by the heat from the heater 3. In this case, it is necessary to configure the supply passage 6c to allow water to be supplied from the water supply portion 6 to the evaporator 4 without being affected by the vaporizer 10.

Figure 6A:
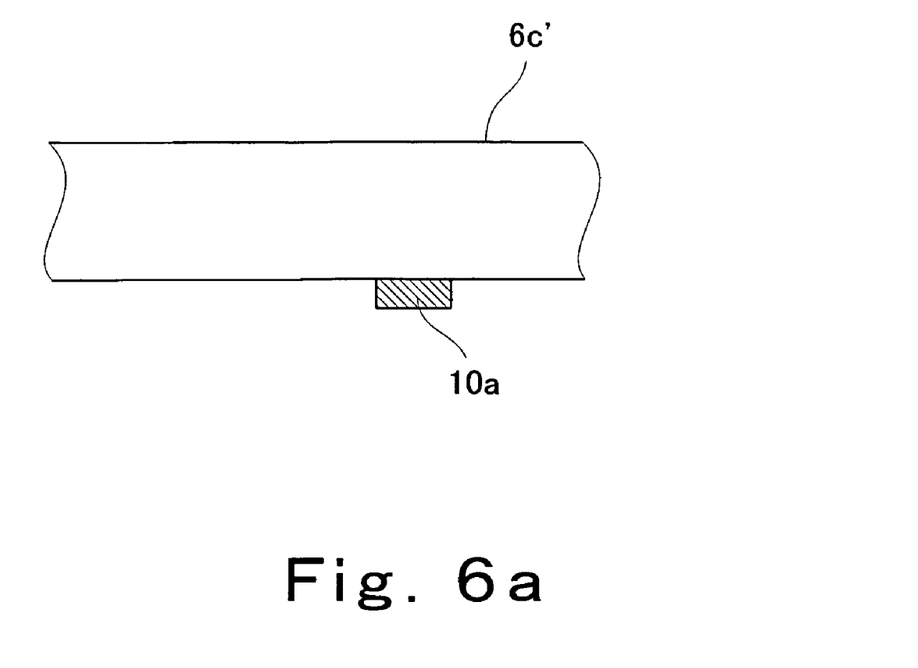
FIGS. 6A and 6B are schematic views showing another configuration of the vaporizer of the hydrogen generation system in FIG. 4.
Figure 6B:
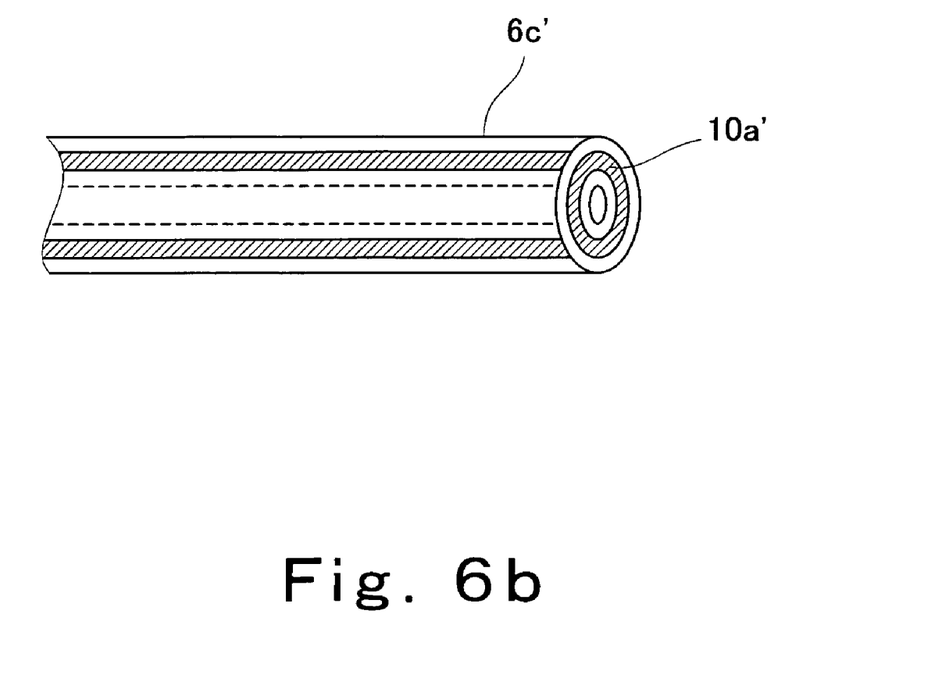

While the vaporizer 10 is comprised of the vaporizing unit 10' shown in FIG. 5, the configuration of the vaporizer 10 is not intended to be limited to this. FIGS. 6A and 6B are cross-sectional views schematically showing another configuration of the vaporizer 10 for use in the system of this embodiment.

As shown in FIG. 6A, instead of the vaporizing unit 10' independently provided as shown in FIG. 5, the vaporizer 10 may be configured such that a heating source 10a' such as an electric heater is outerly fitted onto a pipe forming the supply passage 6c. Alternatively, as shown in FIG. 6B, the vaporizer 10 may be configured to have a pipe containing a built-in heating source such that the pipe forming a supply passage 6c' has an internal double structure defined by circumferentially extending walls and contain a heating source 10a such as an electric heater that surrounds a space as a water flow passage.

The heating source for the vaporizer 10 is not intended to be limited to the above electric heating source such as the electric heater, but may be other suitable heating sources, such as heating sources using combustion heat. For example, the vaporizer 10 may have a general burner as the heating source, including a catalyst burner, a flame burner, or the like, which is configured to conduct combustion using part of an excess hydrogen gas discharged from the destination to which the hydrogen gas generated in the hydrogen generation system is delivered (e.g., a fuel cell anode off-gas), or part of the feed material used in the reforming reaction.

(Fifth Embodiment)

A fifth embodiment of the present invention will be described.

Figure 7:
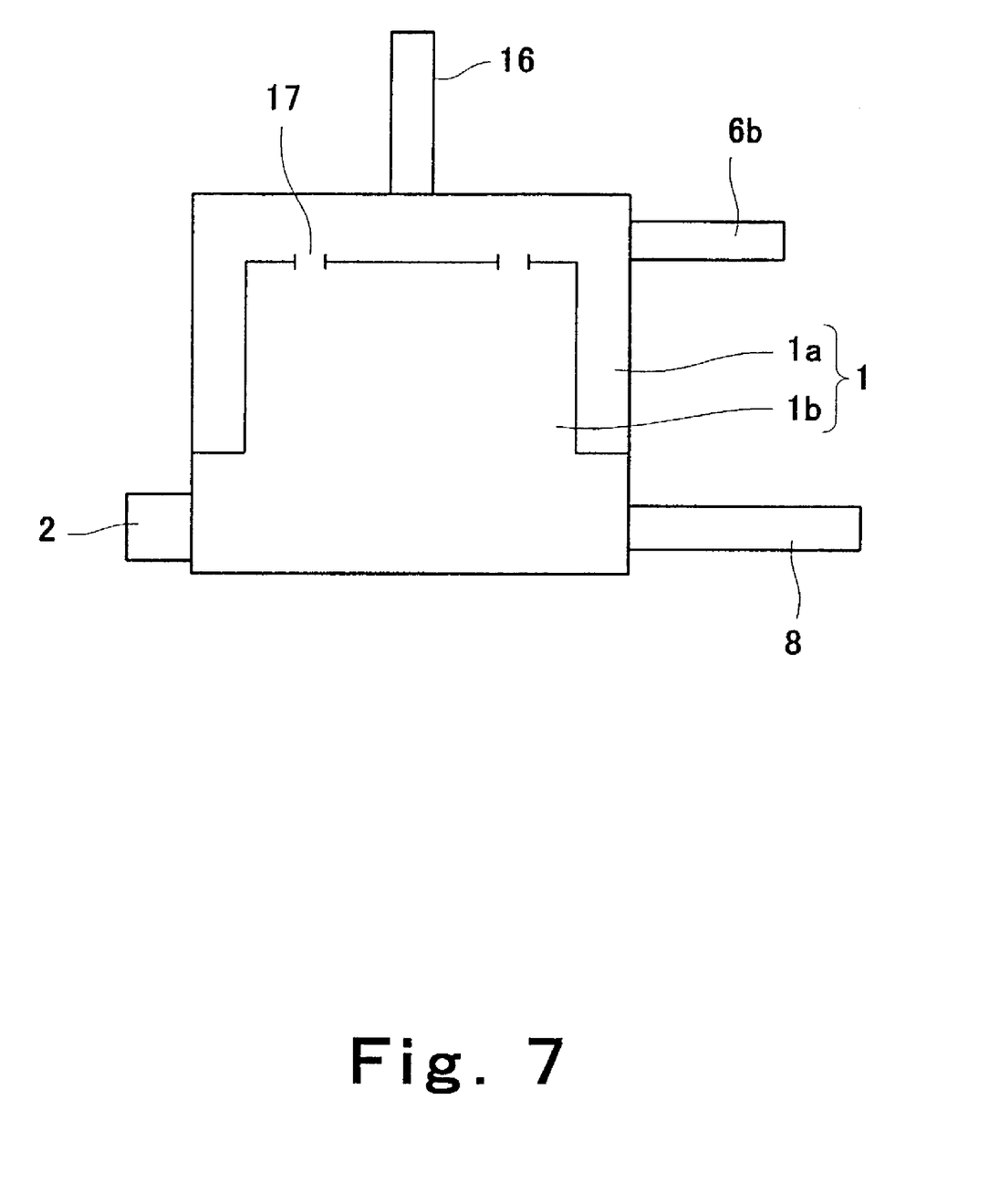
FIG. 7 is a view showing a detailed configuration of a reformer according to a fifth embodiment of the present invention.

A hydrogen generation system of this embodiment has a configuration almost identical to that of the first embodiment except that the reformer 1 is provided with a evaporator 1a. Therefore, a detail of the configuration of the system of this embodiment will not be described and only difference between this system and the system of the first embodiment will be described.

FIG. 7 is a view showing a configuration of the reformer 1 according to the fifth embodiment. As shown in FIG. 7, in this embodiment, the evaporator 1a is provided between the supply passage 6b and the reformer 1 (more specifically, reforming reaction portion 1b containing a reforming catalyst). The evaporator 1a is configured to evaporate water supplied through the supply passage 6b using the heat from the heater 3 (FIG. 1) as mentioned later. The evaporator 1a is connected to the supply passage 6b and the mixed material supply passage 16 and communicates with the reformer 1 through penetrating holes 17. The evaporator 1a needs to be configured to allow heating of a reforming catalyst in the reformer 1 to be conducted with priority during steady operation of the system and enable stable evaporation of water supplied during start of the system. In this embodiment, the evaporator 1a is disposed to surround an outer periphery of the reforming reaction portion 1b and to be located upstream of the reforming reaction portion 1b in the mixed material supply passage 16 as seen from the evaporator 4.

Since an operation of the system of this embodiment is similar to that of the first embodiment, its detail will not be further described and only difference between them will be described. Specifically, in the system of this embodiment, unlike in the first embodiment in which water is directly supplied to the reforming reaction portion 1b through the supply passage 6b, water is first supplied from the water supply portion 6 to the evaporator 1a through the supply passage 6b. Then, in the evaporator 1a, water is evaporated into steam, which is then supplied to the reforming reaction portion 1b through the penetrating holes 17. In this configuration, the reformer 1 has two parts having different functions, i.e., the reforming reaction portion 1b that contains reforming catalyst and conducts reforming reaction, and the evaporator 1a that evaporates water into the steam to be used in the reforming reaction. Therefore, the steam can be generated more stably just after start of the system. In addition, during steady operation of the system, if water remaining unevaporated in the evaporator 1 should be delivered to the reformer 1, such water is evaporated in the evaporator 1a and the resulting steam is reliably supplied to the reforming reaction portion 1b. Consequently, the steam can be supplied stably with less variation in water evaporation, and thereby the reforming reaction can be stabilized.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A hydrogen generation system comprising:
   a reformer that generates a reformed gas that contains hydrogen by reforming reaction from a feed material and steam using a reforming catalyst;
   an evaporator that evaporates water into the steam which is supplied to the reformer;
   a flame burner that heats the reformer and the evaporator for reforming and evaporation, respectively;

a material feed portion that feeds the feed material to the reformer directly or through the evaporator;

a water supply portion that supplies the water; and a water passage through which the water is supplied from the water supply portion to the evaporator, wherein:

an electric heater for heating the evaporator is mounted to be located on the evaporator.

2. The hydrogen generation system according to claim 1, further comprising a control portion that controls the electric heater of the evaporator based on a temperature of the reformer or a temperature of the evaporator.

3. The hydrogen generation system according to claim 2, wherein:

the control portion causes the electric heater of the evaporator to operate when the temperature of the reformer or the temperature of the evaporator is smaller than a preset reference value, and the control portion causes the electric heater of the evaporator to stop when the temperature of the reformer or the temperature of the evaporator is larger than the reference value.

4. The hydrogen generation system according to claim 2, wherein:

the hydrogen generation system comprises a first water supply passage and a second water supply passage, the first water supply passage is the water supply passage through which the water is supplied from the water supply portion to the evaporator, and the second water supply passage is a water supply passage through which the water is supplied from the water supply portion to the reformer.

5. The hydrogen generation system according to claim 4, wherein:

the control portion causes the water supply portion to supply the water to the reformer through the second water supply passage and causes the electric heater of the evaporator to operate when the temperature of the reformer or the temperature of the evaporator is smaller than a preset reference value, and the control portion causes the water supply portion to supply the water to the evaporator through the first water supply passage and causes the electric heater of the evaporator to stop when the temperature of the reformer or the temperature of the evaporator is larger than the reference value.

6. The hydrogen generation system according to claim 4, wherein:

the control portion causes the material feed portion to feed the feed material to the reformer, causes the water supply portion to supply water to the reformer through the second water supply passage, and causes the electric heater of the evaporator to operate when the temperature of the reformer is larger than a preset first reference value, and the control portion causes the water supply portion to supply the water to the evaporator through the first water supply passage and to stop supply of the water to the reformer and causes the electric heater of the evaporator to stop when the temperature of the reformer is larger than a preset second reference value which is larger than the first reference value.

7. The hydrogen generation system according to claim 1, wherein the hydrogen generation system comprises a control portion for controlling the material feed portion and the water supply portion, and the control portion controls the electric heater independently of the flame burner.

8. A fuel cell system comprising:

a hydrogen generation system according to claim 1; and a fuel cell that generates power using an oxidizing agent and hydrogen supplied from the hydrogen generation system.

* * * * *